United States Patent [19]

Byers

[11] 4,192,476
[45] Mar. 11, 1980

[54] RUDDER PEDAL ADJUSTMENT SYSTEM
[75] Inventor: Leroy R. Byers, Redondo Beach, Calif.
[73] Assignee: Northrop Corporation, Los Angeles, Calif.
[21] Appl. No.: 919,469
[22] Filed: Jul. 14, 1978
[51] Int. Cl.² ............... B64C 13/04; B64C 13/30
[52] U.S. Cl. ................... 244/83 K; 244/86; 74/479; 74/561
[58] Field of Search ......... 244/83 R, 83 K, 83 J, 244/86, 83 F, 50, 111; 74/512, 479, 484 R, 486, 512, 560, 561

[56] References Cited
U.S. PATENT DOCUMENTS

| 1,290,280 | 1/1919 | Miller | 244/86 |
| 1,919,520 | 7/1933 | Laddon et al. | 244/86 |
| 2,002,006 | 5/1935 | Hall | 244/86 |
| 3,129,605 | 4/1964 | Bonnel, Jr. et al. | 244/86 |

FOREIGN PATENT DOCUMENTS

| 255619 | 7/1926 | United Kingdom | 244/86 |
| 526026 | 9/1940 | United Kingdom | 244/86 |

*Primary Examiner*—Galen L. Barefoot
*Attorney, Agent, or Firm*—Willard M. Graham

[57] ABSTRACT

A mechanism for positioning an aircraft rudder and brake pedal to accommodate the pilot. The present invention provides a means whereby aircraft rudder and brake cables adjustments are not disturbed when the assembly is repositioned anywhere within the adjustment range of the aircraft.

5 Claims, 1 Drawing Figure

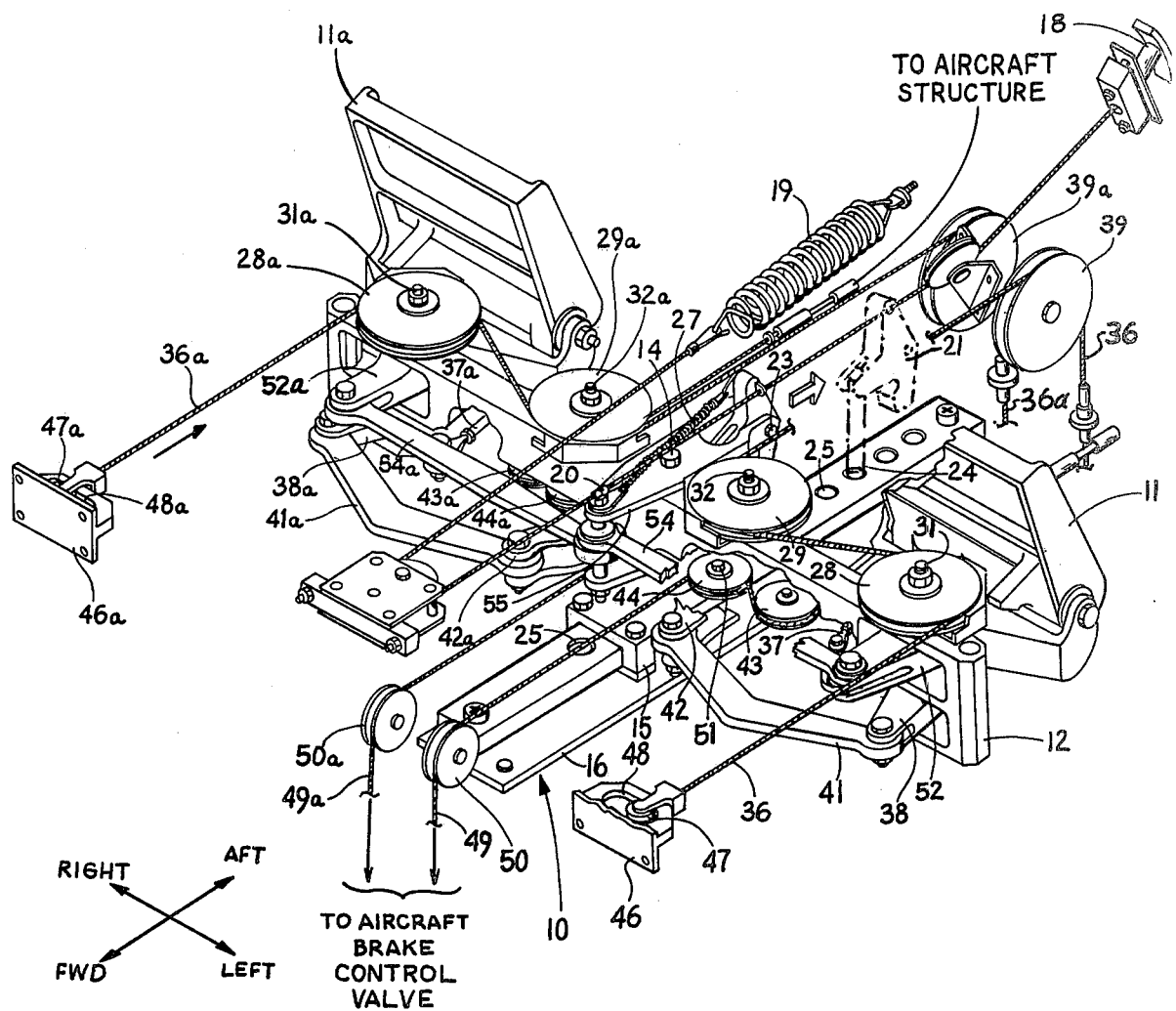

RUDDER PEDAL ADJUSTMENT SYSTEM

STATEMENT OF THE PRIOR ART

The following patent is cited as the most pertinent prior art of which the applicant is aware:

| U.S. PAT. NO. | NAME | DATE |
| --- | --- | --- |
| 2,478,546 | W. A. Pickets, et al | August 1949 |

The cited patent (U.S. Pat. No. 2,478,546) discloses a rudder pedal adjusting mechanism to pivotally change the position of rudder pedals to accommodate pilots having different leg lengths.

The cited patent makes no provisions for brake actuation or adjustment as does the present inventions.

While it is possible that more pertinent art exists, Applicant's search is believed to have been conducted with conscientious effort to locate and evaluate the closest prior art available at the time, but the statement is not to be construed as a representation that no better art exists.

BACKGROUND OF THE INVENTION

Military aircraft rudder pedal design specifications require that the pedals have a ten inch fore and aft adjustment range to accommodate leg lengths of various pilots. The rudder control and brake functions must be transmitted from the rudder pedals, regardless of adjusted position, to some fixed points in the aircraft where bellcranks and torque shafts (which drive cable quadrants or brake valves) may be located. The transmission of the rudder and brake functions to the fixed points has traditionally required a complexity of pushrods and bellcranks.

BRIEF SUMMARY OF THE INVENTION

The present invention provides an aircraft with a rudder and brake pedal assembly which can be adjusted fore and aft within the cockpit of the aircraft without having to make any adjustment to the rudder and brake control mechanisms to compensate for such movement. Traditionally, rudder and brake pedal control cables terminate at fixed points within the aircraft cockpit and therefrom by a complex assembly of pushrods and/or bellcranks to the brake and/or rudder pedals. In using the prior art devices, it is necessary to adjust the pushrods and/or bellcranks each time the rudder and/or brake pedals are repositioned fore or aft within the cockpit. The present invention brings the control cables directly to the rudder and brake pedal mechanism in such a way that the cable position will not be disturbed when the pedals are repositioned anywhere in the adjustment range of the assembly.

It is therefore an object of the present invention to provide a rudder and brake pedal assembly which can be moved fore and aft within the cockpit of an aircraft without having to adjust any aircraft control mechanisms.

BRIEF DESCRIPTION OF THE DRAWING

Referring to the drawing, it should first be noted the present pedal assembly 10 as presented in the FIGURE is symmetrical about a center line running fore and aft between a left pedal 11 and a right pedal 11a. The pedals 11 and 11a are attached to the ends of a rudder bar 12 which is free to rotate about a vertical axis at its center by means of a pivot pin 14, which extends through rudder bar 12 and into a slide member 15 such that if the left pedal 11 is pushed forward, the right pedal 11a will move aft and vis-a-vis.

The aircraft pedal assembly 10 comprises two sections; the first being a track member 16 which is rigidly fastened to the aircraft cockpit floor (not shown) along its center line, and the second being the slide member 15 which is slideable attached to the track member 16 and rotably holds the rudder bar 12 by means of the pivot pin 14.

The fore and aft movement of the slide member 15 provides the adjustment necessary for both short or tall pilots to operate the rudder pedals 11 and 11a comfortably. The method used by the pilot to adjust the slide member 15 is as follows: To move the slide member 15 aft, the pilot pulls on a handle 18. This action places tension on a handle return spring 19 and causes a cable ball 20 to move aft contacting slide lock pin actuator 21 (for ease of understanding, the slide lock pin actuator 21 is shown in phantom aft of its normal attached location as well as being shown attached to the slide member 15). Continuing to pull on the handle 18 causes the slide lock pin acutator 21 to: (a) rotate about an actuator pivot pin 23; (b) lift a lock pin 24 from a given track pin hole 25; (c) apply tension to a lock pin spring 27 (which is situated between the lock pin actuator 21 and the slide member 15) and, (d) allows the slide member 15 to be pulled aft along track member 16 until the desired position is reached.

After the desired position is reached, the handle 18 is released and the return spring 19 returns the handle 18 to its normal position which, in turn, allows the lock pin spring 27 to move the lock pin actuator 21 forward urging the lock pin 24 into one of the track pin holes 25.

To move the slide member 15 forward, the handle 18 is pulled aft until the lock pin 24 is free of the track pin hole 25; then, while holding the handle 18 in the pulled position, the pedals 11 and 11a are pushed forward moving the slide member 15 to the desired position. After the desired position is reached, the handle 18 is release and the lock pin 24 locks the slide member 15 in place by the action described above.

Referring now to the various mechanical parts which comprise the slide member 15, particularly the rudder bar 12 on which the means for controlling the aircraft brakes and rudder(s) (not shown) are located. Attached to the top portion of the rudder bar 12 are two outboard rudder control pulleys 28 and 28a and two inboard rudder control pulleys 29 and 29a. The outboard rudder control pulleys 28 and 28a are affixed with outer vertical axis bolt 31 and 31a to the outer ends of the rudder bar 12 just forward of the pedal 11 and 11a. The inboard rudder control pulleys 29 and 29a are affixed to the rudder bar 12 with inboard vertical axis bolts 32 and 32a located near the center of rudder bar 12.

A pair of rudder control cables 36 and 36a are attached to brackets 46 and 46a by means of bearings 47 and 47a which are free to move in slots 48 and 48a located in the brackets 46 and 46a and allows one end of each rudder cable 36 and 36a to move inward as the rudder pedals 11 and 11a are operated. The brackets 46 and 46a are attached to a cockpit forward bulkhead (not shown) and provides the starting point for rigging the rudder cables 36 and 36a which are string aft from the brackets 46 and 46a then bent approximately 100 degrees around the outboard rudder control pulleys 28 and 28a, then inboard around the inboard rudder control pulleys 29 and 29a and again aft to idler pulleys 39 and 39a and on to other elements of the rudder control system (not shown).

The straight fore and aft orientation of the rudder control cables 36 and 36a ahead and behind the pedal assembly 10 permits the slide member 15 to be adjusted as a unit along the track member 16 without taking up or letting out either rudder control cable 36 and 36a.

The aircraft rudder(s) are operated when the pilot pushes forward on only one pedal, for example pedal 11. This action rotates the rudder bar 12 about its center pivot pin 14 and the opposite pedal 11a moves aft toward him. The rotation of the rudder bar 12 causes the rudder control pulleys, for example, 28 and 29 located on the left end of the rudder bar 12 to let out on rudder control cable 36 while the other rudder control pulleys 28a and 29a located on the opposite end of the rudder bar 12 to take up the other rudder control cable 36a a like amount. The differential motion of the two rudder control cables 36 and 36a control the aircraft rudder motion.

It can be understood from referring to the drawing that the face of the rudder pedals 11 and 11a remain at an angle of 90° relative to slide member 15 during operation of the aircraft's rudder(s). The pedals 11 and 11a maintain their relative position to the slide member 15 by parallel-rule action resulting from the pedals 11 and 11a being pivotally mounted to the rudder bar 12 by the outer vertical axis bolts 31 and 31a and further pivotally joined together through rudder pedal cross-piece extentions 52 and 52a which, in turn, pivotally holds the outer end of rudder linkages 54 and 54a. The inner ends of the rudder linkages 54 and 54a are pivotally attached to a cross support member 55 which is actually a forward extending section of slide member 15 and completes the parallelogram necessary for parallel-rule action to exist.

The aircraft wheel brakes (not shown) are independently controlled by rotating the tips of the pedals 11 and 11a forward. This action pulls aft on the push rod 37 and 37a and causes bellcranks 38 and 38a to rotate about the outer vertical axis bolts 31 and 31a which extend through the outboard rudder pulleys 28 and 28a. The rotation of bellcranks 38 and 38a causes a brake bar 41 and 41a to move inboard and rotate brake pulley bellcranks 42 and 42a which are pivotally mounted to the slide member 15 by vertical axis pins (one pin 51 shown) which extend through brake pulley bellcrank 42 and 42a and into the slide member 15. Two inboard brake pulleys 44 and 44a are arranged, inboard on each brake pulley bellcrank 42 and 42a and two outboard brake pulleys 43 and 43a are arranged, outboard on each brake pulley bellcrank 42 and 42a. A pair of brake cables 49 and 49a for operation by pedal 11 and 11a are rigged as follows: One end of each brake cable 49 and 49a are fixed to the aircraft brake control valve (not shown) at a point forward of the pedal assembly 10, the brake cable 49 and 49a are strung aft over brake idler pulleys 50 and 50a around the inboard brake pulley 44 and 44a then around the outboard brake pulley 43 and 43a and aft to the aircraft structure (not shown). The straight fore and aft orientation of the brake cables 49 and 49a ahead of and behind the pedal assembly 10 permits the slide member 15 to be positioned as a unit along the track member 16 without readjusting the brake cables 49 and 49a. The brake pulleys 43, 43a, 44 and 44a merely roll along the brake cables 49 and 49a as the slide member 15 is positioned. When the pilot pushes forward on the tip of the pedals 11 or 11a, he rotates the corresponding brake pulley bellcranks 42 or 42a about the central axis of the inboard brake pulleys 44 or 44a and the brake cables 49 or 49a is thus taken on, operating the brake valve (not shown).

While in order to comply with the statute, the invention has been described in language more or less specific as to structural features, it is to be understood that the invention is not limited to the specific features shown but that the means and construction herein disclosed comprise a preferred form of putting the invention into effect, and the invention is therefore claimed in any of its forms or modifications within the legitimate and valid scope of the appended claims.

I claim:

1. In an aircraft having a cockpit, a rudder and brake control system, and pilot's manual rudder and brake control mechanism, comprising:
   a. a track member rigidly attached to a floor portion of said aircraft,
   b. a slide member slidably attached to said track member, said slide member including means for adjusting and locking said slide member along said track member,
   c. a bar member pivotally attached to said slide member,
   d. two rudder pedals pivotally attached to said bar member, and
   e. rudder and brake control means to independently operate said aircraft rudder and brake systems through actuation of said rudder pedals, said brake control means includes two brake control cables, each of said cables having one end thereof attached to aircraft structure and rigged such that each of said cables extends around an inboard and an outboard brake pulley mounted on each side of said slide member with said cables extending from said inboard and outboard pulleys to said aircraft brake control system,
   wherein said brake control system is actuated by differential movement of said inboard and outboard brake pulleys operating on said brake control cables.

2. The control mechanism of claim 1 wherein said rudder control means include two rudder control cables each having one end slidably attached to said aircraft and rigged such that each of said cables extends around an outboard and an inboard rudder control pulley mounted on said bar member with said cables extending from said pulleys to said aircraft rudder control system.

3. The rudder control means of claim 2 wherein said rudder control system is actuated by differential movement of said inboard and outboard rudder pulleys operating on said rudder control cables.

4. The control mechanism of claim 1 wherein said rudder pedals are pivotally mounted to said rudder bar with the surface of said rudder pedal forming an angle at 90° relative to said slide member; said control mechanism including means to maintain said 90° angle throughout the operating range thereof.

5. The control mechanism of claim 1 wherein said slide member is selectively locked to said track member by a pin which is pivotally mounted to said slide member and received in a selected hole provided in said track member.

* * * * *